(12) United States Patent
Matsui et al.

(10) Patent No.: US 7,856,890 B2
(45) Date of Patent: Dec. 28, 2010

(54) PRESSURE DETECTOR AND METHOD OF MANUFACTURING THE SAME

(75) Inventors: Hiroshige Matsui, Nukata-gun (JP); Kiyoshi Otsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 12/219,393

(22) Filed: Jul. 22, 2008

(65) Prior Publication Data

US 2009/0084191 A1 Apr. 2, 2009

(30) Foreign Application Priority Data

Sep. 28, 2007 (JP) .............................. 2007-254672

(51) Int. Cl.
*G01N 3/02* (2006.01)

(52) U.S. Cl. .......................................... 73/850; 73/715

(58) Field of Classification Search ................... None
See application file for complete search history.

(56) References Cited

U.S. PATENT DOCUMENTS

| | | | | |
|---|---|---|---|---|
| 5,488,868 | A * | 2/1996 | Ootake et al. ................. | 73/708 |
| 6,446,856 | B2 | 9/2002 | Shirai et al. | |
| 7,114,396 | B2 * | 10/2006 | Oda et al. ..................... | 73/715 |
| 7,263,891 | B2 * | 9/2007 | Oda ............................. | 73/715 |
| 7,302,855 | B2 * | 12/2007 | Oda ............................. | 73/756 |
| 7,404,328 | B2 * | 7/2008 | Matsui ......................... | 73/715 |
| 7,536,916 | B2 * | 5/2009 | Matsui et al. ................. | 73/753 |
| 7,628,078 | B2 * | 12/2009 | Matsui et al. ................. | 73/715 |
| 2006/0162141 | A1 | 7/2006 | Takeuchi | |
| 2008/0053237 | A1 | 3/2008 | Matsui et al. | |

FOREIGN PATENT DOCUMENTS

| | | |
|---|---|---|
| JP | 04-348241 A | 12/1992 |
| JP | 2006-071507 | 3/2006 |
| JP | 2006-194736 A | 7/2006 |

OTHER PUBLICATIONS

Office Action mailed on Jul. 14, 2009 from the Japan Patent Office for corresponding Japanese patent application No. 2007-254672 (English translation enclosed).

* cited by examiner

*Primary Examiner*—Lisa M Caputo
*Assistant Examiner*—Jermaine Jenkins
(74) *Attorney, Agent, or Firm*—Posz Law Group, PLC

(57) ABSTRACT

In a manufacturing method of a pressure detector, a first member that includes a sensing portion for outputting an electric signal in accordance with a pressure, a second member that includes a pressure-receiving diaphragm, and a pressure transmission member are prepared. The pressure transmission member is disposed between the sensing portion and the pressure-receiving diaphragm and the first member and the second member are welded in a state where the pressure is applied from the pressure-receiving diaphragm to the sensing portion through the pressure transmission member. One of the first member and the second member are strained so that a preliminary load, which is applied from the pressure-receiving diaphragm to the sensing portion through the pressure transmission member in a state where no external pressure is applied to the pressure-receiving diaphragm, meets a predetermined value.

18 Claims, 5 Drawing Sheets

PRESSURE DETECTOR AND METHOD OF MANUFACTURING THE SAME

CROSS REFERENCE TO RELATED APPLICATIONS

The present application is based on and claims priority to Japanese Patent Application No. 2007-254672 filed on Sep. 28, 2007, the contents of which are incorporated in their entirety herein by reference.

BACKGROUND OF THE INVENTION

1. Field of the Invention

The present invention relates to a pressure detector and a method of manufacturing the pressure detector.

2. Description of the Related Art

As an example of the prior art, US 2006/0162141A (corresponding to JP-A-2006-208043) discloses a method of manufacturing a pressure detector that can be suitably used for a combustion pressure sensor. The method includes steps of: preparing a first member including a sensing portion, a second member including a pressure-receiving diaphragm, and a pressure transmission member; inserting the pressure transmission member between the first member and the second member; monitoring an electric signal from the sensing portion, the electric signal corresponding to a preliminary load applied from the diaphragm to the sensing portion; determining the preliminary load on the basis of the monitored signal; and welding the first member and the second member in a state where the preliminary load is applied to the sensing portion.

In the above-described manufacturing method, even when the preliminary load is controlled to approach a predetermined value by monitoring the electric signal from the sensing portion, the preliminary load is difficult to be controlled with a high degree of accuracy due to a welding strain that is generated when the first member and the second member are welded.

The term "welding strain" means that at least one of the first member and the second member expands or contracts in a longitudinal direction of the first member and the second member due to increase or decrease of a volume of welding part of the first member and the second member. The preliminary load is a load that is applied from the first member and the second member to the pressure transmission member in a state where a pressure is not applied to the pressure transmission member from an outside of the pressure detector.

In a case where the welding is performed by using a laser beam, if an energy of the laser beam fluctuates, different welding strain is generated in each pressure detector due to a dimensional variation of the first member and the second member and a noise signal generated in a device for monitoring the electric signal from the sensing portion. Thus, the preliminary load of each pressure detector may vary.

SUMMARY OF THE INVENTION

In view of the foregoing problems, it is an object of the present invention to provide a method of manufacturing a pressure detector that can reduce a variation in a preliminary load. Another object of the invention is to provide a pressure detector.

According to a first aspect of the invention, a method of manufacturing a pressure detector includes: preparing a first member that includes a sensing portion for outputting an electric signal in accordance with a pressure, a second member that includes a pressure-receiving diaphragm for receiving the pressure, and a pressure transmission member for transmitting the pressure received by the pressure-receiving diaphragm to the sensing portion; disposing the pressure transmission member between the sensing portion and the pressure-receiving diaphragm; welding the first member and the second member in a state where the pressure is applied from the pressure-receiving diaphragm to the sensing portion through the pressure transmission member; and straining one of the first member and the second member so that a preliminary load, which is applied from the pressure-receiving diaphragm to the sensing portion through the pressure transmission member in a state where no external pressure is applied to the pressure-receiving diaphragm, meets a predetermined value.

In the present manufacturing method, even when each pressure detector has different welding strain at a time when the first member and the second member are welded, the welding strain can be controlled with a high degree of accuracy by staining the one of the first member and the second member. As a result, a variation in the preliminary load of each pressure detector can be reduced.

According to a second aspect of the invention, a pressure detector includes a first member, a second member, a pressure transmission member, a first welding part, and a strain part. The first member includes a sensing portion for outputting an electric signal in accordance with a pressure. The second member includes a pressure-receiving diaphragm for receiving the pressure. The pressure transmission member is disposed between the pressure-receiving diaphragm and the sensing portion for transmitting the pressure received by the pressure-receiving diaphragm to the sensing portion. The first welding part is configured to join the first member and the second member and is formed in a state where a load is applied from the pressure-receiving diaphragm to the sensing portion through the pressure transmission member. The strain part is located at one of the first member and the second member so that a preliminary load, which is applied from the pressure-receiving diaphragm to the sensing portion through the pressure transmission member in a state where no external pressure is applied to the pressure-receiving diaphragm, meets a predetermined value.

In the present pressure detector, the preliminary load is controlled by the stain part. Thus, a variation in a welding strain of each pressure detector can be reduced and a variation in the preliminary load of each pressure detector can be reduced.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
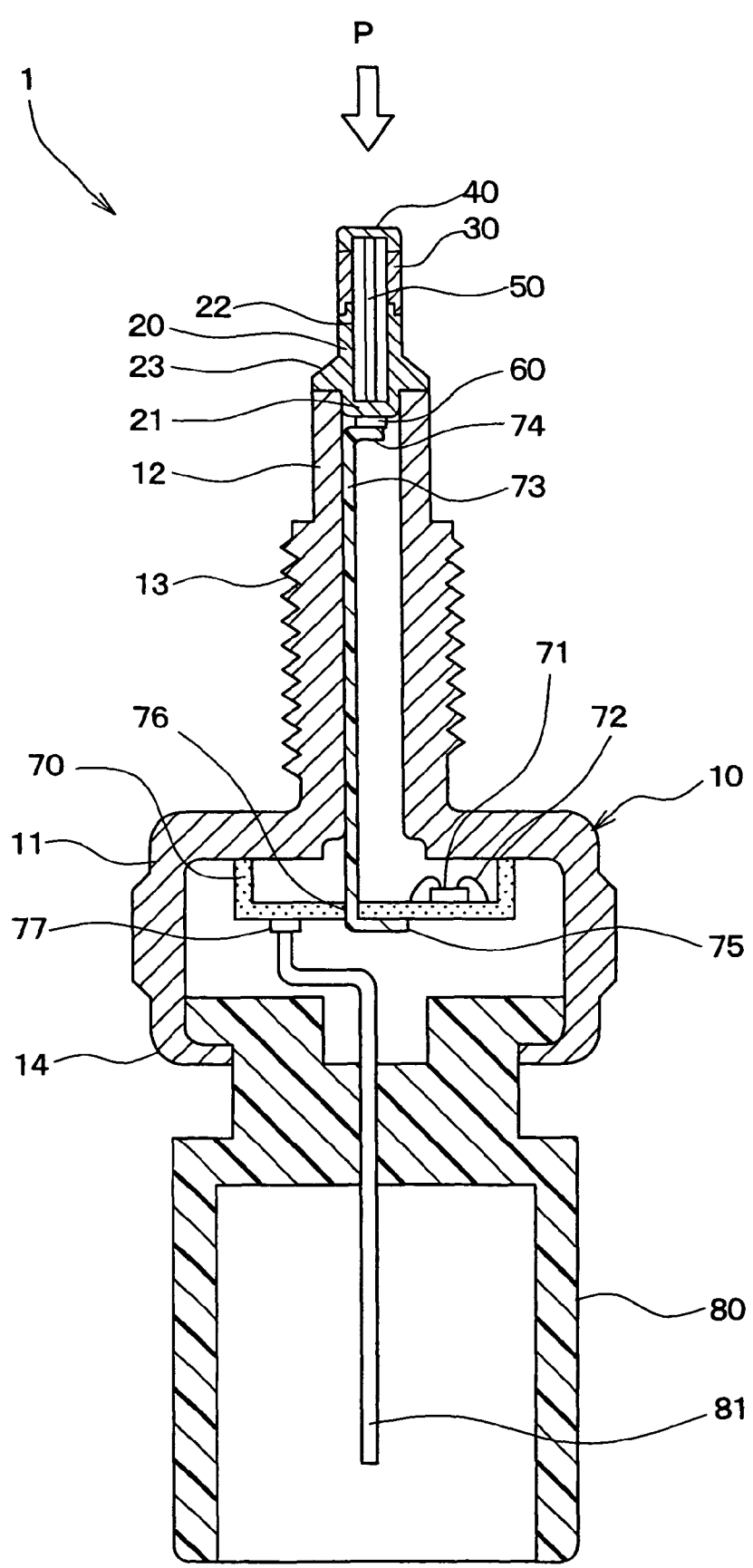
FIG. 1 is a cross-sectional view illustrating a pressure detector according to a first embodiment of the invention.

A pressure detector 1 according to a first embodiment of the invention will be described with reference to FIG. 1 and FIG. 2. The pressure detector 1 can be suitably used for a combustion pressure sensor of a vehicle, for example, and is configured to be attached to an engine head of the vehicle for detecting a pressure in a combustion chamber.

The pressure detector 1 includes a housing 10, a stem 20, a metal case 30, a pressure-receiving diaphragm 40, a rod 50, a sensor chip 60, a circuit board 70, and a connector case 80.

The housing 10 includes a body 11 having a cylindrical shape and a pipe section 12 that is longer and narrower than the body 11. The body 11 and the pipe section 12 are made of metal, for example, stainless steel. The body 11 and the pipe section 12 are formed by machining or cold forging, for example. The body 11 and the pipe section 12 may be integrally formed.

Alternatively, the body 11 and the pipe section 12 may be formed separately. In the present case, the body 11 and the pipe section 12 may be integrated by welding, bonding, press-fitting, screwing, or caulking. The pipe section 12 may have a cylindrical shape or a rectangular pipe shape, for example.

At an outer peripheral surface of the pipe section 12, a thread part 13 is formed. The pipe section 12 is screwed into an attaching hole of an engine block through the thread part 13, and thereby the pressure detector 1 is attached to the engine block.

The stem 20 is made of a metal and has a cylindrical shape. A pressure-sensing diaphragm 21 is provided at one end side of the stem 20 and an opening portion 22 is provided at the other end side of the stem 20. The pressure-sensing diaphragm 21 is thin and is configured to be deformable. The stem 20 has a flange 23 at an outer wall on a side of the pressure-sensing diaphragm 21. The flange 23 protrudes in a direction approximately perpendicular to the outer wall. The flange 23 has a taper shape in which a width of the flange 23 increases from a side of the opening portion 22 toward a side of the pressure-sensing diaphragm 21.

The opening portion 22 of the stem 20 is positioned on a side of the combustion chamber. A portion of the stem 20 on a side of the pressure-sensing diaphragm 21 is inserted into an end of the pipe section 12 of the housing 10 and is fixed, for example, by welding or bonding.

The stem 20 and the pressure-sensing diaphragm 21 correspond to a first member. The stem 20 may have a rectangular pipe shape.

The metal case 30 is made of metal, for example, stainless steel. The metal case 30 has a cylindrical shape, for example. A first opening portion of the metal case 30 is inserted into the opening portion 22 of the stem 20 and the metal case 30 and the stem 20 are welded. Thereby, a first welding part 90 for joining the metal case 30 and the stem 20 is provided at a portion where the metal case 30 and the stem 20 overlap.

The first welding part 90 may be provided at the whole circumference of the metal case 30 and the stem 20 around an axis of the metal case 30, for example. The welding may be performed by laser welding, resistance welding, or plasma welding.

The pressure-receiving diaphragm 40 faces the combustion chamber and is configured to be deformed by receiving a combustion pressure P. The pressure-receiving diaphragm 40 is made of metal, for example, stainless steel. The pressure-receiving diaphragm 40 has a disk shape, for example. The pressure-receiving diaphragm 40 is fixed at a second opening portion of the metal case 30 on an opposite side of the stem 20 by brazing or welding. Thereby, the metal case 30 and the pressure-receiving diaphragm 40 are integrated. The opening portion 22 of the stem 20 is covered by the pressure-receiving diaphragm 40 through the metal case 30.

The integrated metal case 30 and the pressure-receiving diaphragm 40 correspond to a second member. Thus, the second member includes the metal case 30 and the pressure-receiving diaphragm 40 that is integrated with the metal case 30 at the second opening portion.

The rod 50 is disposed in a hollow portion provided in the stem 20 and the metal case 30. The rod 50 transmits a pressure received at the pressure-receiving diaphragm 40 to the sensor chip 60. The rod 50 is arranged between the pressure-receiving diaphragm 40 and the pressure-sensing diaphragm 21 of the stem 20.

A first end portion of the rod 50 on a side of the stem 20 is in contact with the pressure-sensing diaphragm 21 while applying a load to the pressure-sensing diaphragm 21. A second end portion of the rod 50 on a side of metal case 30 is in contact with the pressure-receiving diaphragm 40 while applying load to the pressure-receiving diaphragm 40. Thus, the metal case 30 and the stem 20 are welded in a state where the load is applied from the pressure-receiving diaphragm 40 to the pressure-sensing diaphragm 21 and the sensor chip 60 through the rod 50 and a state where the pressure-receiving diaphragm 40 is not applied with a detecting pressure (i.e., external pressure) P. When the pressure-receiving diaphragm 40 receives the detecting pressure P, the detecting pressure P is transmitted from the pressure-receiving diaphragm 40 to the sensor chip 60 through the rod 50 and the pressure-sensing diaphragm 21.

The rod 50 may be made of ceramic or metal, for example, stainless steel. In FIG. 2, the rod 50 has a column shape, as an example. Alternatively, the rod 50 may have a spherical shape, an oblate spherical shape, or a column shape in which a diameter decreases toward a middle portion in a longitudinal direction. The rod 50 corresponds to a pressure transmission member.

The stem 20 has a second welding part 91 at a side surface thereof so that a preliminary load meets a predetermined value. The preliminary load is a load that is applied from the pressure-receiving diaphragm 40 to the sensor chip 60 through the rod 50 in a state where the pressure-receiving diaphragm 40 is not applied with a load from an outside of the pressure detector 1.

As described above, the metal case 30 and the stem 20 are welded in a state where the preliminary load is applied from the pressure-receiving diaphragm 40 to the sensor chip 60 through the rod 50, and thereby the first welding part 90 is provided. However, the preliminary load may not meet the predetermined value by just providing the first welding part 90. Thus, in addition to the first welding part 90, the second welding part 91 is provided at the side surface of the stem 20. The second welding part 91 generates a welding strain in the stem 20, and thereby the preliminary load meets the predetermined value. The welding strain is generated in such a direction that the stem 20 contracts toward the second welding part 91 in a longitudinal direction of the stem 20, as illustrated as the arrows in FIG. 2. In this way, the preliminary load is compensated to meet the predetermined value by the second welding part 91.

The second welding part 91 may be provided at the whole circumference of the side surface of the stem 20 or a part of the side surface of the stem 20. The second welding part 91 may be provided by laser welding, resistance welding, plasma welding, or pulse welding, for example. The second welding part 91 corresponds to a strain part.

The sensor chip 60 outputs an electric signal in accordance with a pressure applied to the sensor chip 60. The sensor chip 60 is attached to a surface of the pressure-sensing diaphragm 21, which is an opposite surface of the surface where the rod 50 contacts, by glass welding. The sensor chip 60 has a strain gauge function. When the sensor chip 60 has the strain gauge function, the sensor chip 60 strains by receiving a pressure and outputs a signal in accordance with a detected pressure based on the strain amount.

For example, the sensor chip 60 is constructed with a silicon semiconductor chip having a bridge circuit including a diffused resistor.

When the pressure-sensing diaphragm 21 is deformed by receiving a pressure, the sensor chip 60 strains in accordance with the deformation. Then, the sensor chip 60 converts a change in resistance due to the strain into an electric signal and outputs the electric signal. Thus, the sensor chip 60 and the pressure-sensing diaphragm 21 stain by receiving a load due to the detecting pressure P. The sensor chip 60 corresponds to a sensing portion.

The circuit board 70 includes a circuit for processing the electric signal from the sensor chip 60. The circuit board 70 is made of a ceramic substrate, for example. The circuit board 70 is disposed in the body 11 of the housing 10. Specifically, the circuit board 70 is disposed to cover an opening portion of the pipe section 12 on a side of the body 11. A peripheral portion of the circuit board 70 is fixed to the housing 10, for example, by adhering.

An integrated circuit chip (IC chip) 71 is mounted on a first surface of the circuit board 70 on a side of the opening portion of the pipe section 12. The IC chip 71 has a circuit for amplifying or adjusting the output from the sensor chip 60. The IC chip 71 and the circuit board 70 are electrically coupled through bonding wires 72 made of aluminum (Al) or gold (Au).

The circuit board 70 and the sensor chip 60 are electrically coupled through a flexible printed circuit board 73. The flexible printed circuit board 73 includes a base, for example, made of polyimide resin. On the base, a conductor, for example, copper is pattern-formed. The flexible printed circuit board 73 is disposed in the pipe section 12 of the housing 10 and extends in the longitudinal direction of the pipe section 12. Instead of the flexible printed circuit board 73, a lead wire may be provided, for example.

A first end portion 74 of the flexible printed circuit board 73 is electrically and mechanically connected to a pad (not shown) disposed on a surface of the sensor chip 60, for example, by soldering. The flexible printed circuit board 73 is bended at a portion adjacent to the first end portion 74, and a portion between the bended portion and a second end portion 75 extends in the pipe section 12 toward the circuit board 70.

The second end portion 75 of the flexible printed circuit board 73 is located in the body 11 of the housing 10. The circuit board 70 has a through hole 76. The second end portion 75 of the flexible printed circuit board 73 protrudes through the through hole 76 to a side of a second surface of the circuit board 70 that opposes the first surface. The second end portion 75 is electrically coupled with the second surface of the circuit board 70, for example, by soldering.

The connector case 80 is provided for outputting the electric signal processed at the IC chip 71 to an outside of the pressure detector 1. The connector case 80 is connected to the body 11 of the housing 10 to face the second surface of the circuit board 70.

The connector case 80 is made of resin, for example, polyphenylene sulfide (PPS). A plurality of terminals 81 is integrated with the connector case 80, for example, by insert molding. The terminals 81 include a terminal for a power supply and a terminal for outputting the electric signal.

The terminals 81 are electrically coupled with the circuit board 70 through a spring member 77. Thus, the sensor chip 60 is electrically coupled with the connector case 80 through the flexible printed circuit board 73 and the circuit board 70.

The body 11 of the housing 10 has a caulking portion 14, and the caulking portion 14 engages with the connector case 80. Thereby, the connector case 80 and the housing 10 are integrated. The terminals 81 can be electrically coupled with an electronic control unit (ECU) of the vehicle through a wiring member (not shown). Thereby, the pressure detector 1 can send and receive electric signals with an external device.

A method of manufacturing the pressure detector 1 will now be described. At first, the sensor chip 60, the stem 20 including the pressure-sensing diaphragm 21, and the rod 50 are prepared. The sensor chip 60 is attached to the surface of the pressure-sensing diaphragm 21, for example, by glass welding. Then, the first end portion 74 of the flexible printed circuit board 73 is coupled with the sensor chip 60, for example, by soldering.

Next, the second end portion 75 of the flexible printed circuit board 73 is inserted from the end portion of the pipe section 12 of the housing 10 so that the second end portion 75 of the flexible printed circuit board 73 reaches in the body 11 of the housing 10. In addition, the stem 20 and the pipe section 12 are joined.

The second end portion 75 of the flexible printed circuit board 73 is inserted into the through hole 76 of the circuit board 70 on which the IC chip 71 is mounted. The second end portion 75 is coupled with the circuit board 70, for example, by soldering.

Next, the circuit board 70 is fixed to the body 11 of the housing 10. The connector case 80 is connected with the body 11 and the caulking portion 14 of the housing 10 is engaged with the connector case 80. Thereby, the connector case 80 and the housing 10 are fixed. The terminals 81 are electrically coupled with the circuit board 70 through the spring member 77. As a result, the sensor chip 60, the stem 20, and the housing 10 are integrated.

The metal case 30 and the pressure-receiving diaphragm 40 are integrated, for example, by brazing or welding.

The rod 50 is disposed between the sensor chip 60 and the pressure-receiving diaphragm 40. The stem 20 and the metal case 30 are welded in a state where the preliminary load is applied from the pressure-receiving diaphragm 40 to the pressure-sensing diaphragm 21 and the sensor chip 60 through the rod 50. Thereby, the first welding part 90 is formed.

Now, an exemplary method of forming the first welding part 90 will be described. At first, a voltage is supplied from a power source (not shown) to the sensor chip 60 through the terminal 81 for the power supply. Thereby, the sensor chip 60 is ready for detecting a pressure.

The terminal 81 for outputting electric signals is electrically coupled with a multimeter for monitoring a voltage of the electric signals.

A load is applied to the pressure-receiving diaphragm 40 by using a load-applying apparatus (not shown). When the load is applied from the pressure-receiving diaphragm 40 to the sensor chip 60 through the rod 50, the multimeter measures the electric signal from the sensor chip 60.

The load applied from the load-applying apparatus to the pressure-receiving diaphragm 40 is controlled to approach the predetermined value based on the electric signal measured by the multimeter. In this way, it can be determined whether the preliminary load becomes the predetermined value based on the electric signal of the sensor chip 60.

Thus, when the electric signal from the sensor chip 60 becomes the predetermined value in a state where the load is applied to the pressure-receiving diaphragm 40, the overlapping portion of the stem 20 and the metal case 30 are welded. Thereby, the first welding part 90 is formed. The welding may be performed by laser welding, resistance welding, or plasma welding.

For example, the welding is performed at the whole circumference of the overlapping portion of the stem 20 and the metal case 30. In the present case, a preliminary welding is performed at plural points from a surrounding of the overlapping portion of the stem 20 and the metal case 30, at first. Then, the whole circumference of the overlapping portion is welded so that the stem 20 and the metal case 30 are joined.

In this way, the stem 20 and the metal case 30 are welded in a state where the preliminary load is applied from the pressure-receiving diaphragm 40 to the sensor chip 60 through the rod 50. Thereby, the pressure detector 1 can detect the detecting the pressure P. However, the preliminary load may vary among pressure detectors 1 due to a dimensional variation of components and a noise signal generated in the multimeter even when the pressure detectors 1 are manufactured by the same method.

Thus, the output from the sensor chip 60 is measured by the multimeter in a state where the pressure P is not applied to the pressure-receiving diaphragm 40. Thereby, it is determined that whether the preliminary load of the pressure detector 1 meets the predetermined value. If the preliminary load of the pressure detector 1 meets the predetermined value, the manufacturing process of the pressure detector 1 ends.

In contrast, when it is determined that the preliminary load does not meet the predetermined value based on the output from the sensor chip 60, an additional process is performed.

For example, an additional welding is performed to one of the stem 20 and the metal case 30. Thereby, a welding strain is intentionally generated in the one of the stem 20 and the metal case 30, and the preliminary load can meet the predetermined value.

In the present embodiment, the second welding part 91 is formed on the side surface of the stem 20 in a manner similar to the first welding part 90. The second welding part 91 is provided at the whole circumference or a part of the side surface of the stem 20. Thereby, the welding strain is intentionally generated in the stem 20, and the stem 20 contracts in the longitudinal direction of the stem 20 toward the second welding part 91, as illustrated by the arrows in FIG. 2.

After forming the second welding part 91, the output from the sensor chip 60 is monitored and it is determined whether the preliminary load meets the predetermined value. If the preliminary load meets the predetermined value, the manufacturing process of the pressure detector 1 ends. If the preliminary load does not meet the predetermined value, the additional welding is further performed. In this way, the pressure detector 1 illustrated in FIG. 1 and FIG. 2 is manufactured.

An exemplary operation of the pressure detector 1 now will be described. For example, the pressure detector 1 is attached to a threaded hole (the attaching hole) provided at the engine head through the thread part 13 of the housing 10. In the present case, the taper surface of the flange 23 of the stem 20 is attached firmly to an inner surface of the attaching hole of the engine head and is sealed. Thereby, the pressure detector 1 is fixed to the engine head.

The pressure P in the combustion chamber is applied to the pressure-receiving diaphragm 40 as illustrated in FIG. 1, and the rod 50 transmits the pressure P from the pressure-receiving diaphragm 40 to the pressure-sensing diaphragm 21 of the stem 20. Then, the pressure-sensing diaphragm 21 deforms and the sensor chip 60 converts the deformation into the electric signal. The electric signal output from the sensor chip 60 is transmitted to the circuit board 70 through the flexible printed circuit board 73 and is processed by the IC chip 71. The processed electric signal is output from the terminals 81 to the external device.

As described above, in the present manufacturing method, after the first welding part 90 is provided in the pressure detector 1, the second welding part 91 is provided at the stem 20 by additional welding so that the preliminary load applied from the pressure-receiving diaphragm 40 to the sensor chip 60 through the rod 50 meets the predetermined value.

Thereby, the welding strain is intentionally generated in the stem 20, and the preliminary load applied to the sensor chip 60 can meet the predetermined value. Thus, even when each pressure detector 1 has different preliminary load at a time when the first welding part 90 is provided, the welding strain of the pressure detector 1 can be controlled with a high degree of accuracy by providing the second welding part 91 and the variation in the welding strain can be reduced. As a result, the variation in the preliminary load of each pressure detector 1 can be reduced.

In addition, because the variation in the preliminary load applied to the sensor chip 60 can be reduced, a nonlinearity property and an offset temperature property of each pressure detector 1 becomes constant. Thus, a production variation of the pressure detector 1 can be reduced and a yield can be improved.

Second Embodiment

Figure 3:
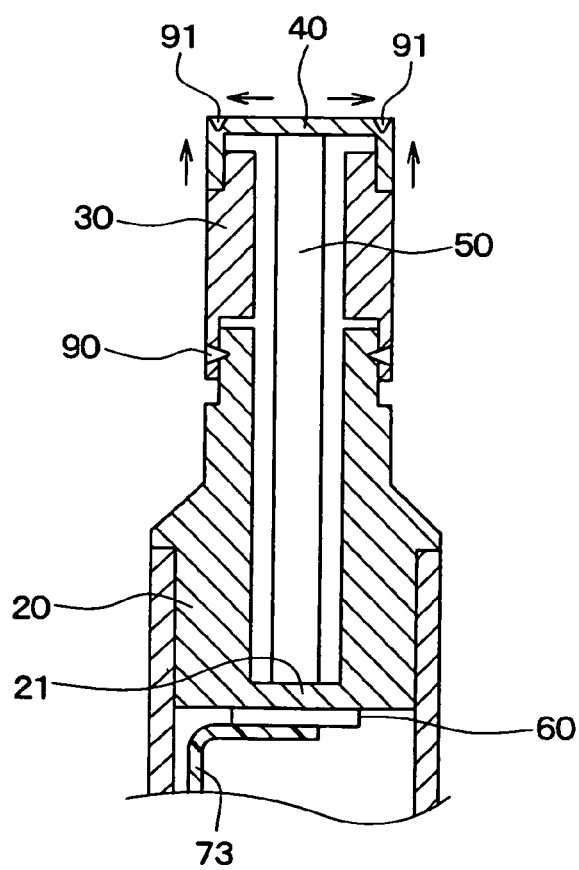
FIG. 3 is an enlarged cross-sectional view illustrating a portion in the vicinity of a stem according to a second embodiment of the invention.

A pressure detector 1 according to a second embodiment of the invention has the second welding part 91 at the pressure-receiving diaphragm 40 as illustrated in FIG. 3.

For example, the second welding part 91 is provided at an outer peripheral portion of a surface of the pressure-receiving diaphragm 40. The second welding part 91 may have a ring shape. Alternatively, the second welding part 91 may be formed partially.

When the second welding part 91 is provided at the pressure-receiving diaphragm 40, the welding strain is generated in the longitudinal direction of the metal case 30 toward the pressure-receiving diaphragm 40 and in a radial direction of the surface of the pressure-receiving diaphragm 40 toward an outside, as illustrated by the arrows in FIG. 3. Thereby, the preliminary load applied to the sensor chip 60 can meet the predetermined value and the variation in the preliminary load of each pressure detector 1 can be reduced.

Third Embodiment

Figure 4:
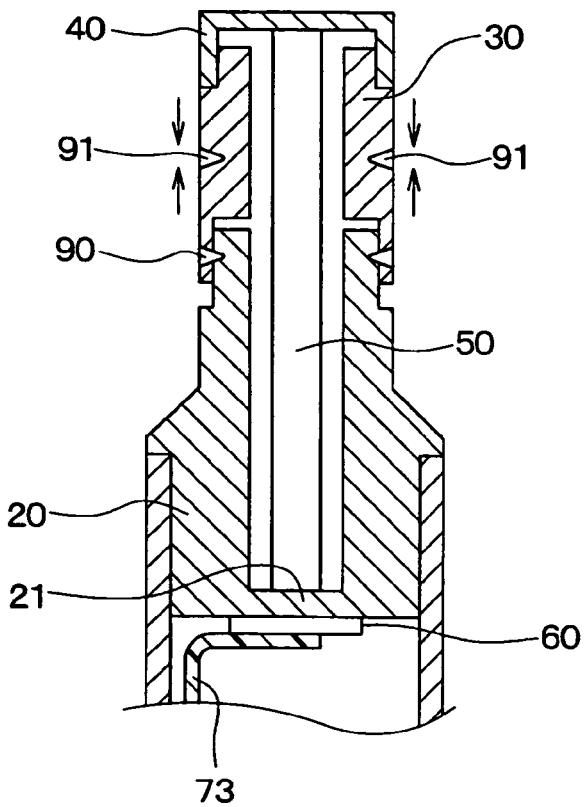
FIG. 4 is an enlarged cross-sectional view illustrating a portion in the vicinity of a stem according to a third embodiment of the invention.

A pressure detector 1 according to a third embodiment of the invention has the second welding part 91 at the metal case 30 as illustrated in FIG. 4.

For example, the second welding part 91 is provided at an outer wall of the metal case 30. The second welding part 91 is provided at the whole circumference of the outer wall or a part of the outer wall.

When the second welding part 91 is provided at the metal case 30, the welding strain is generated in such a direction that the metal case 30 contracts in the longitudinal direction of the metal case 30 toward the second welding part 91. Thereby, the preliminary load applied to the sensor chip 60 can meet the predetermined value and the variation in the preliminary load of each pressure detector 1 can be reduced.

Fourth Embodiment

A pressure detector 1 according to a fourth embodiment of the invention will be described with reference to FIG. 5. A sidewall of the metal case 30 of the present embodiment is thinner than a sidewall of the metal case 30 of the above-described first to third embodiments.

Figure 2:
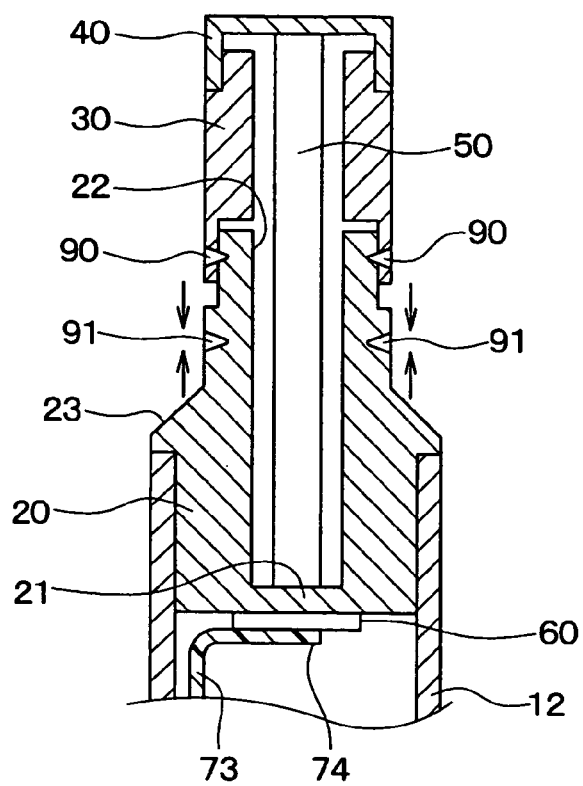
FIG. 2 is an enlarged cross-sectional view illustrating a portion in the vicinity of a stem illustrated in FIG. 1.
Figure 5:
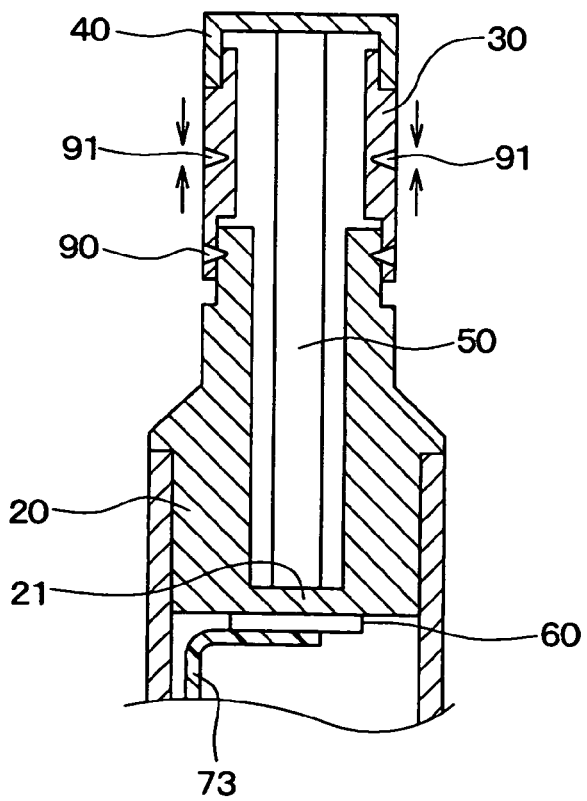
FIG. 5 is an enlarged cross-sectional view illustrating a portion in the vicinity of a stem according to a fourth embodiment of the invention.

That is, an inner diameter of the metal case 30 illustrated in FIG. 5 is larger than inner diameters of the metal cases 30 illustrated in FIGS. 2-4. The additional welding is performed at the outer wall of the metal case 30, and thereby the second welding part 91 is provided at the outer wall of the metal case 30.

The welding strain becomes larger when a welded object becomes thinner. Thus, by forming the second welding part 91 at the metal case 30 according to the present embodiment, a larger welding strain can be generated compared with a case where the second welding part 91 is formed at the metal case 30 illustrated in FIG. 4. In this way, the welding strain can be controlled by reducing the thickness of the sidewall of the metal case 30. Thus, the variation in the welding strain can be further reduced.

Fifth Embodiment

Figure 6:
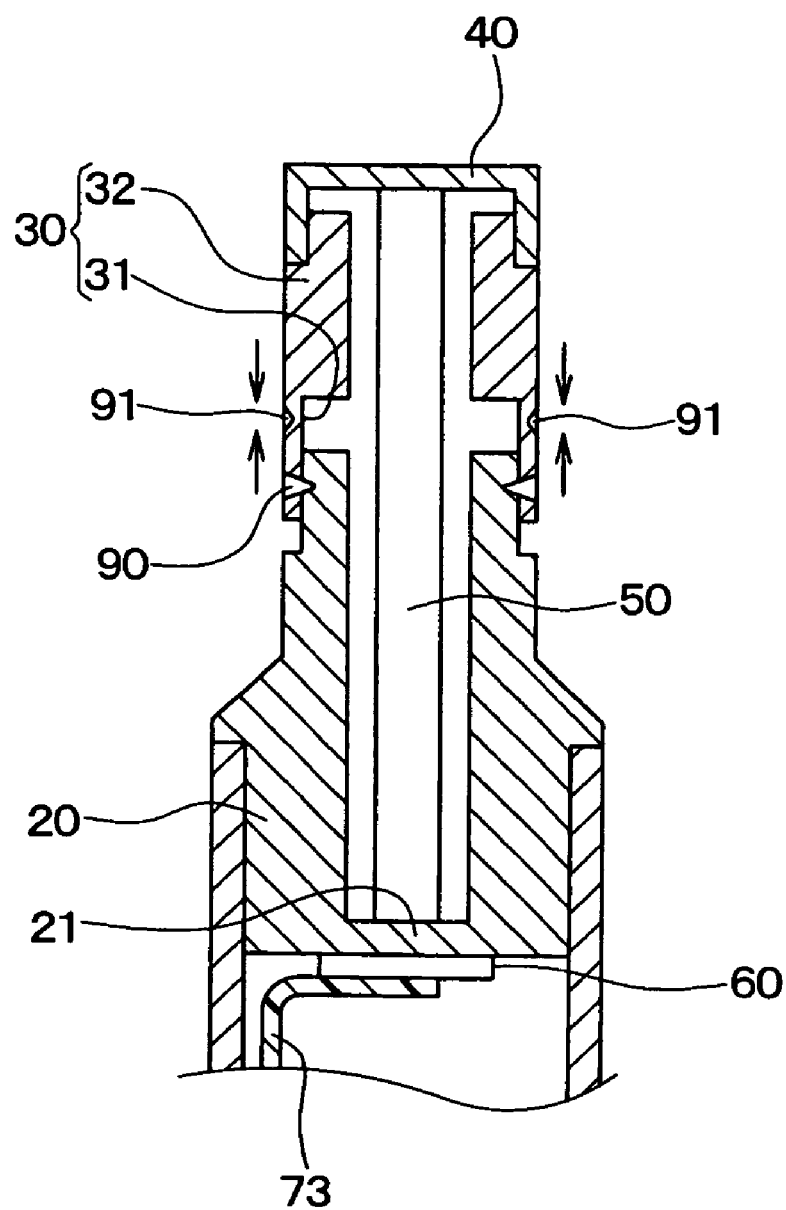
FIG. 6 is an enlarged cross-sectional view illustrating a portion in the vicinity of a stem according to a fifth embodiment of the invention.

A pressure detector 1 according to a fifth embodiment of the invention will be described with reference to FIG. 6.

The present metal case 30 has a first section 31 and a second section 32. The first section 31 is thinner than the second section 32. For example, the metal case 30 has the first section 31 at a portion where the stem 20 overlaps. Alternatively, the first section 31 may be located other portion in the metal case 30.

For example, the second welding part 91 is provided at an outer wall of the first section 31. As described above, when a welding is performed at a thin object, a large welding strain can be generated. Thus, the additional welding can be performed at the first section 31 or the second section 32 depending on the preliminary load. When the second welding part 91 is provided at the first section 31, the preliminary load can be controlled by generating a large welding strain.

Sixth Embodiment

Figure 7:
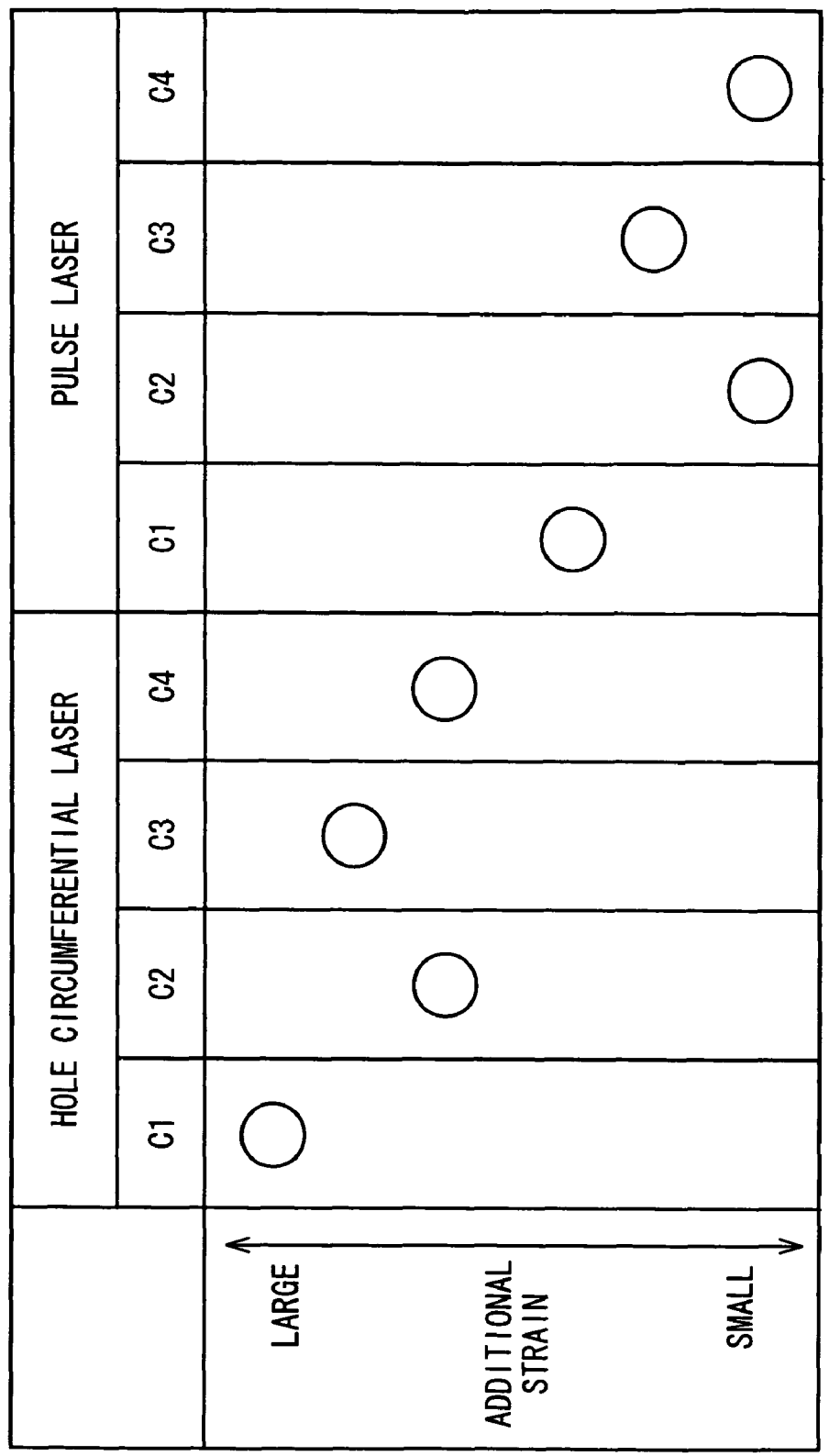
FIG. 7 is a diagram illustrating a relationship among additional strain amount, welding methods, and welded portions.

In the first to fifth embodiments, the preliminary load is controlled by performing the additional welding at one of the stem 20, the metal case 30, and the pressure-receiving diaphragm 40. The amount of the welding strain is different from portion to portion where the additional welding is performed. When the welded object is thin, the additional strain amount is large. In contrast, when the welded object is thick, the additional strain amount is small. Thus, by mapping the amount of welding strain in advance, as illustrated in FIG. 7, a portion to be welded can be selected easily.

A welding method can be selected from a whole circumferential laser and a pulse laser. The term "whole circumferential laser" in FIG. 7 means that the additional welding is performed at the whole circumference around the axial direction of the pressure detector 1. The term "pulse laser" in FIG. 7 means that the additional welding is performed at one point or plural point. The portion to be welded can be selected from the pressure-receiving diaphragm 40 (C1), the first section 31 of the metal case 30 (C2), the second section 32 of the metal case 30 (C3), and the stem 20 (C4).

In this way, a relationship among the additional strain amount, the welding methods, and the welded portions may be investigated in advance to make a control table. In the present case, the portion to be welded can be selected easily by using the control table.

Other Embodiment

Although the present invention has been fully described in connection with the preferred embodiments thereof with reference to the accompanying drawings, it is to be noted that various changes and modifications will become apparent to those skilled in the art.

In the above-described first to sixth embodiments, the additional welding is performed at one portion of one component, as an example. Alternatively, the additional welding may be performed at plural portion of one component. Alternatively, the additional welding may be performed at different components, for example, the stem 20 and the metal case 30. Alternatively, the additional welding may be performed at plural portion of different components.

In the above-described first to sixth embodiments, the welding strain is intentionally generated by the additional welding for controlling the preliminary load. Alternatively, one of the stem 20, the metal case 30, and the pressure-receiving diaphragm 40 may be intentionally strained by pulling, twisting, or wringing for controlling the preliminary load. Also in the present cases, the variation in the preliminary load of each pressure detector 1 can be reduced. The pulling, the twisting, or the wringing may be combined with the additional welding.

In the above-described first to sixth embodiments, it is determined whether the preliminary load meets the predetermined value by monitoring the output from the sensor chip 60 after performing the additional welding. Alternatively, the additional welding may be performed while monitoring the output from the sensor chip 60.

Such changes and modifications are to be understood as being within the scope of the present invention as defined by the appended claims.

What is claimed is:

1. A method of manufacturing a pressure detector, comprising:

preparing a first member that includes a sensing portion for outputting an electric signal in accordance with a pressure, a second member that includes a pressure-receiving diaphragm for receiving the pressure, and a pressure transmission member for transmitting the pressure received by the pressure-receiving diaphragm to the sensing portion;

disposing the pressure transmission member between the sensing portion and the pressure-receiving diaphragm;

welding the first member and the second member in a state where the pressure is applied from the pressure-receiving diaphragm to the sensing portion through the pressure transmission member; and straining one of the first member and the second member so that a preliminary load meets a predetermined value, wherein the preliminary load is a load that is applied from the pressure-receiving diaphragm to the sensing portion through the pressure transmission member in a state where no external pressure is applied to the pressure-receiving diaphragm.

2. The method according to claim 1, wherein
the straining one of the first member and the second member includes welding the one of the first member and the second member additionally.

3. The method according to claim 2, wherein
the additional welding is performed at a side surface of the first member.

4. The method according to claim 2, wherein
the additional welding is performed at the pressure-receiving diaphragm.

5. The method according to claim 2, wherein
the additional welding is performed at an outer wall of the second member.

6. The method according to claim 2, wherein
the second member includes a first section having a first thickness and a second section having a second thickness that is larger than the first thickness; and
the additional welding is performed at an outer wall of the first section.

7. The method according to claim 1, wherein
the one of the first member and the second member is strained by pulling.

8. The method according to claim 1, wherein
the one of the first member and the second member is strained by twisting.

9. The method according to claim 1, wherein
the one of the first member and the second member is strained by wringing.

10. A pressure detector comprising:
a first member that includes a sensing portion for outputting an electric signal in accordance with a pressure;
a second member that includes a pressure-receiving diaphragm for receiving the pressure;
a pressure transmission member that is disposed between the pressure-receiving diaphragm and the sensing portion for transmitting the pressure received by the pressure-receiving diaphragm to the sensing portion;
a first welding part that is configured to join the first member and the second member and that is formed in a state where a load is applied from the pressure-receiving diaphragm to the sensing portion through the pressure transmission member; and
a strain part that is located at one of the first member and the second member so that a preliminary load meets a predetermined value, wherein the preliminary load is a load that is applied from the pressure-receiving diaphragm to the sensing portion through the pressure transmission member in a state where no external pressure is applied to the pressure-receiving diaphragm.

11. The pressure detector according to claim 10, wherein
the strain part includes a second welding part that is different from the first welding part.

12. The pressure detector according to claim 11, wherein
the second welding part is located at a side surface of the first member.

13. The pressure detector according to claim 11, wherein
the second welding part is located at the pressure-receiving diaphragm.

14. The pressure detector according to claim 11, wherein
the second welding part is located at an outer wall of the second member.

15. The pressure detector according to claim 11, wherein:
the second member includes a first section having a first thickness and a second section having a second thickness that is larger than the first thickness; and
the second welding part is located at an outer wall of the first section.

16. The pressure detector according to claim 10, wherein
the strain part is provided by pulling the one of the first member and the second member.

17. The pressure detector according to claim 10, wherein
the strain part is provided by twisting the one of the first member and the second member.

18. The pressure detector according to claim 10, wherein
the strain part is provided by wringing the one of the first member and the second member.

* * * * *